(12) United States Patent
Michelau

(10) Patent No.: US 6,871,863 B2
(45) Date of Patent: Mar. 29, 2005

(54) WAGON CUP HOLDER

(75) Inventor: Frederick J. Michelau, Des Plaines, IL (US)

(73) Assignee: Radio Flyer INC, Chicago, IL (US)

( * ) Notice: Subject to any disclaimer, the term of this patent is extended or adjusted under 35 U.S.C. 154(b) by 0 days.

(21) Appl. No.: 10/265,865

(22) Filed: Oct. 7, 2002

(65) Prior Publication Data

US 2004/0066013 A1 Apr. 8, 2004

(51) Int. Cl.[7] ............................................... B62B 9/00
(52) U.S. Cl. ........................ 280/87.01; 280/87.021; 280/47.35
(58) Field of Search .................. 280/87.01, 87.021, 280/650, 655, 7.15, 653, 659, 47.34, 47.35, 79.2

(56) References Cited

U.S. PATENT DOCUMENTS

| | | | |
|---|---|---|---|
| 1,226,231 A | | 5/1917 | Mack |
| 1,975,083 A | | 10/1934 | Cavanagh |
| 2,731,182 A | * | 1/1956 | Higgins ...................... 224/566 |
| 3,526,934 A | | 9/1970 | Owen, Sr. |
| D248,909 S | | 8/1978 | Frazian |
| D252,310 S | | 7/1979 | Shannon |
| D257,458 S | | 10/1980 | Benoit |
| D277,149 S | | 1/1985 | Hind |
| D308,556 S | | 6/1990 | Klawitter |
| 4,930,831 A | | 6/1990 | Valiga et al. |
| D308,992 S | | 7/1990 | Wagner |
| 5,209,441 A | | 5/1993 | Satoh |
| 5,599,037 A | * | 2/1997 | Spickler ...................... 280/652 |
| D379,570 S | | 6/1997 | Moon |
| 5,857,695 A | * | 1/1999 | Crowell ...................... 280/651 |
| 5,876,049 A | | 3/1999 | Spear et al. |
| 5,911,422 A | * | 6/1999 | Carpenter et al. ............. 280/8 |
| 5,938,091 A | * | 8/1999 | Bergin et al. ................ 224/411 |
| 6,186,382 B1 | * | 2/2001 | Bergin et al. ................ 224/411 |
| 6,220,611 B1 | * | 4/2001 | Shapiro .................... 280/47.34 |
| 6,299,184 B1 | * | 10/2001 | Krawczyk .................. 280/79.2 |
| 6,446,981 B1 | * | 9/2002 | Wise et al. ................. 280/7.17 |
| 6,581,945 B1 | * | 6/2003 | Shapiro ........................ 280/30 |

* cited by examiner

Primary Examiner—Christopher P. Ellis
Assistant Examiner—Bridget Avery
(74) Attorney, Agent, or Firm—DLA Piper Rudnick Gray Cary US LLP

(57) ABSTRACT

A children's wagon featuring a cup holder has a molded plastic body and side, front and rear walls. The walls include inner and outer panels and the outer panel of one of the side walls has three wells formed therein. Three corresponding cavities are formed in the inner panel and the wells and cavities communicate via three bores. An E-shaped bracket features three legs that are connected to outer sections so that two openings are defined to receive beverage containers or the like. Each leg features an end with a pin positioned thereon. Each pin has an enlarged head portion. The bracket is secured to the wall with the ends of the legs engaging the cavities, the pins passing through the bores and the enlarged pin head portions positioned within the wells. Curved surfaces are molded in the inner panel and face the bracket openings and a ledge is molded in the inner panel and positioned below the bracket. A sticker or the like placed on the outer panel covers the wells.

17 Claims, 5 Drawing Sheets

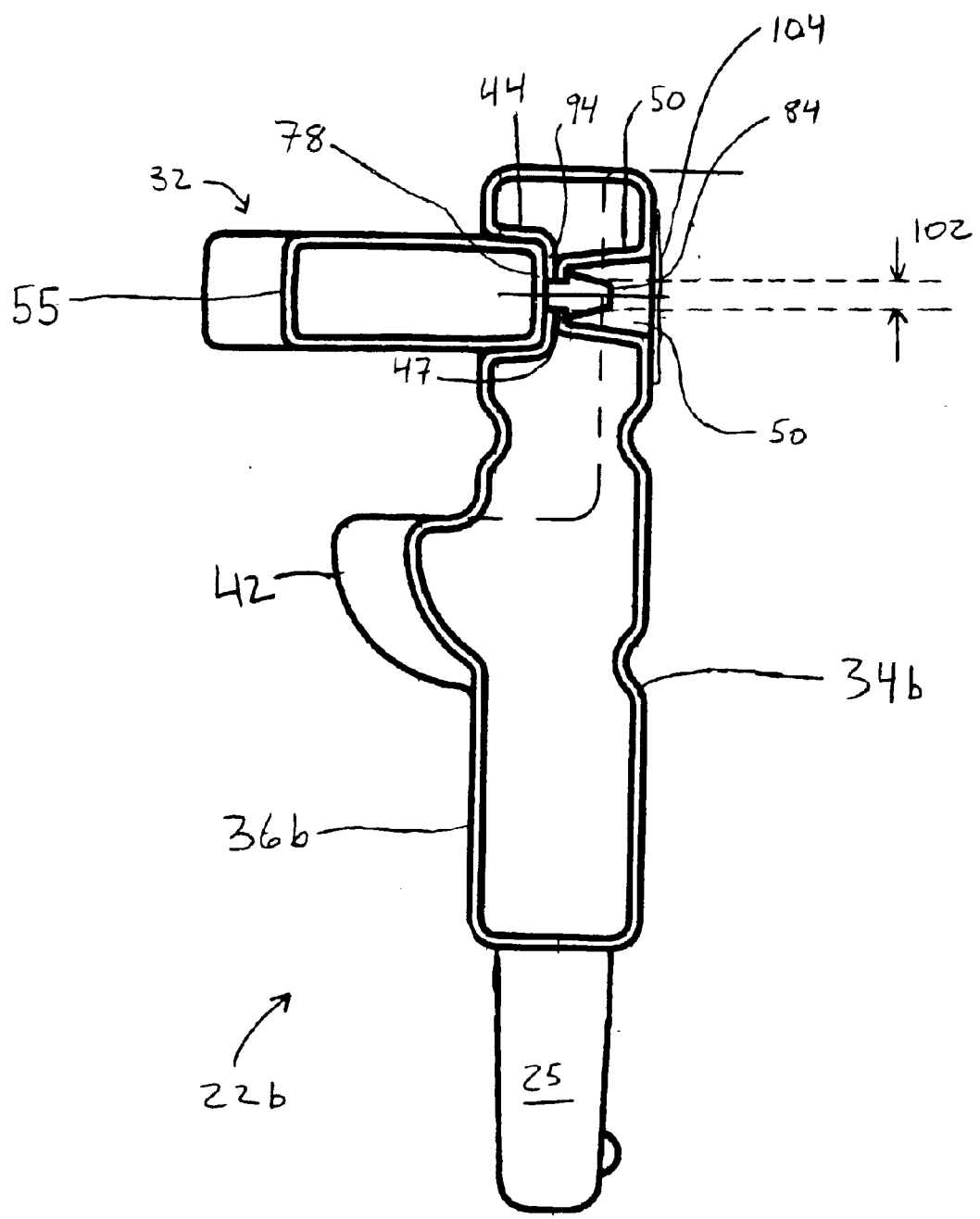

WAGON CUP HOLDER

BACKGROUND OF THE INVENTION

The present invention relates generally to children's wagons and, in particular, to a cup holder for plastic wagons.

The typical toy wagon includes a wagon body having a planar bottom portion and walls extending upwardly from the bottom portion to form a passenger compartment for carrying a child or cargo. The wagon body is supported by front and back wheel assemblies, which provide rolling contact with the ground. The front wheel assembly typically includes a bolster that is attached to the bottom surface of the body of the wagon in a pivoting fashion. A handle is connected to the bolster for pivoting the front wheel assembly such that steering can be effected.

Due to durability, cost and weight concerns, wagons constructed of plastic are becoming increasingly popular. Such wagons often include side, front and end walls molded from plastic. The walls typically feature an inner panel and an outer panel so as to provide a double-walled construction. The wagon walls are often removable so that the wagon may be more easily transported, in the trunk of a car, for example, or stored.

It is desirable to provide wagons with cup holders so that a person may transport children or objects while carrying the child's or that person's beverage. An example of a prior art wagon with cup holder is presented in U.S. Design Pat. No. Des. 308,992 to Wagner. In this design, a shelf with circular openings is positioned across the leading portion of the wagon compartment, that is, between the wagon side walls and adjacent to the front wall of the wagon. A disadvantage of this design, however, is that, the cup holder takes up a considerable amount of valuable space within the passenger compartment of the wagon.

A further disadvantage of the cup holder of the Wagner '992 patent is that in order to support cups, the openings must be sized slightly smaller than the diameter of the tops of the cups. This has a large impact on the types and sizes of cups that may be accommodated by the device. Furthermore, in order to support cups that are sized smaller than the opening, the shelf must be placed close to the bottom of the wagon so that the bottom may support the cups. This means that the wagon must either be constructed with a very shallow passenger compartment or the shelf must be positioned inconveniently away from the top edges of the wagon side walls.

Constructing a cup holder in the wall of a plastic wagon presents numerous challenges. For example, in cases where the cup or container is heavy, the plastic wall may have a tendency to contort or bow under the load if the cup holder is only fastened to the inner panel of the wall. Attachments or brackets that fasten to both the inner and outer wall panels, however, may protrude through the exterior surface of the outer panel of the wall, causing unsightly bulges that may snag or tear clothing. As a result, it is desirable to provide a cup holder that does not protrude through the exterior surface of the outer panel of the side wall and, at the same time, fastens to both the inner and outer panels of the wall.

Accordingly, it is an object of the present invention to provide a cup holder for a plastic children's wagon whereby the exterior surfaces of the wagon walls remain free of protrusions.

It is a further object of the present invention to provide a cup holder for a plastic wall of a children's wagon that is sturdy.

It is still a further object of the present invention to provide a children's wagon with a cup holder that is economical to manufacture.

Other objects and advantages will be apparent from the remaining portion of the specification.

SUMMARY OF THE INVENTION

A wagon having a cup holder features a plastic body, a pair of front wheels, a pair of rear wheels and a handle. The wagon also features plastic side, front and rear walls positioned on the body so that a cargo area is defined. Each of the wagon walls includes an inner panel and an outer panel. One of the wagon sides walls features one or more cavities formed in the inner panel and one or more corresponding wells formed in the outer panel. The cavities and wells communicate with one another by way of bores formed in the inner and outer panels.

A molded generally E-shaped plastic bracket has three legs with outer sections connected to the legs so that two openings are defined. The openings are sized to receive containers or the like. Each of the bracket legs includes an end with a pin positioned thereon. Each pin has an enlarged head portion. The bracket is secured to the inner panel of the side wall with the leg ends in engagement with the cavities, the pins passing through the bores and the enlarged pin head portions positioned within the wells. Stickers or the like are positioned on the outer panel and cover the wells.

The inner panel has a pair of curved surfaces formed therein that face the openings of the bracket. In addition, the inner panel has a ledge formed therein and positioned beneath the bracket and the pair of curved surfaces so that a container or the like placed in the bracket openings and adjacent the inner panel curved surfaces is supported from below by the ledge.

BRIEF DESCRIPTION OF THE DRAWINGS

FIG. 5 is a sectional view of the cup holder and the right side wall of the wagon of FIG. 1 taken along line 5—5.

DESCRIPTION OF THE PREFERRED EMBODIMENTS

Figure 1:
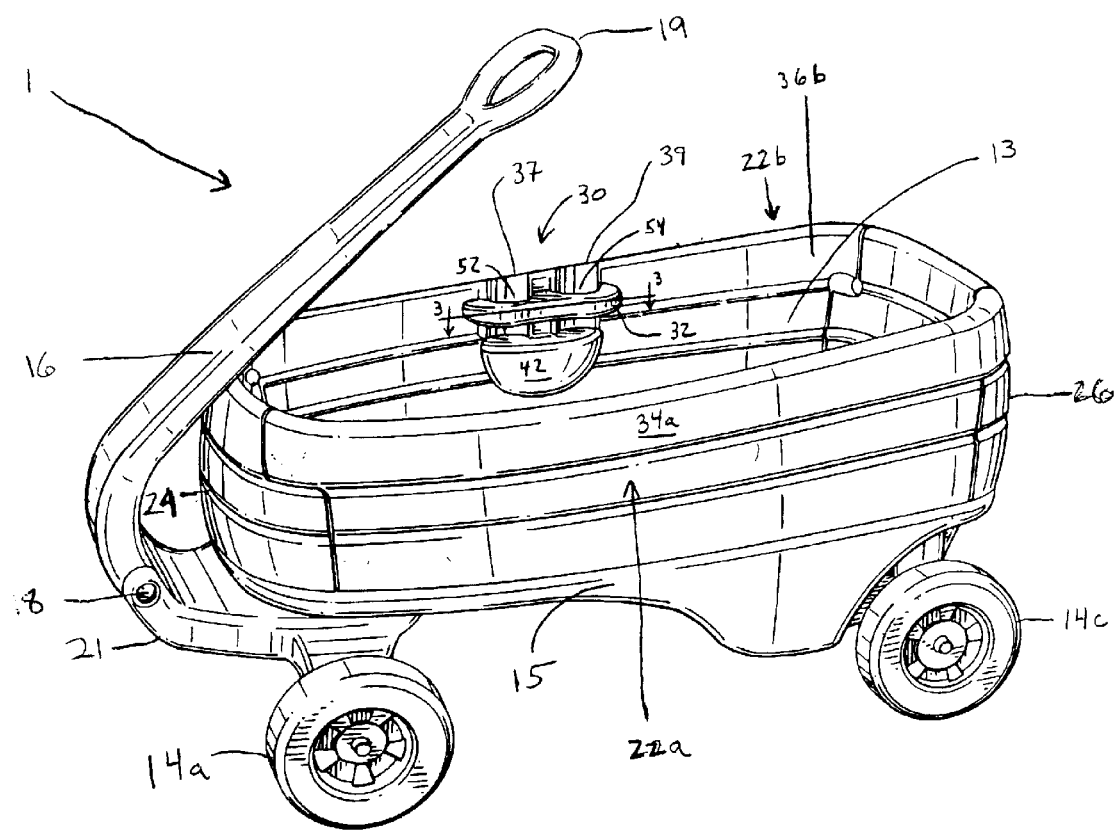
FIG. 1 is a perspective view of a wagon equipped with an embodiment of the cup holder of the present invention.
Figure 2:
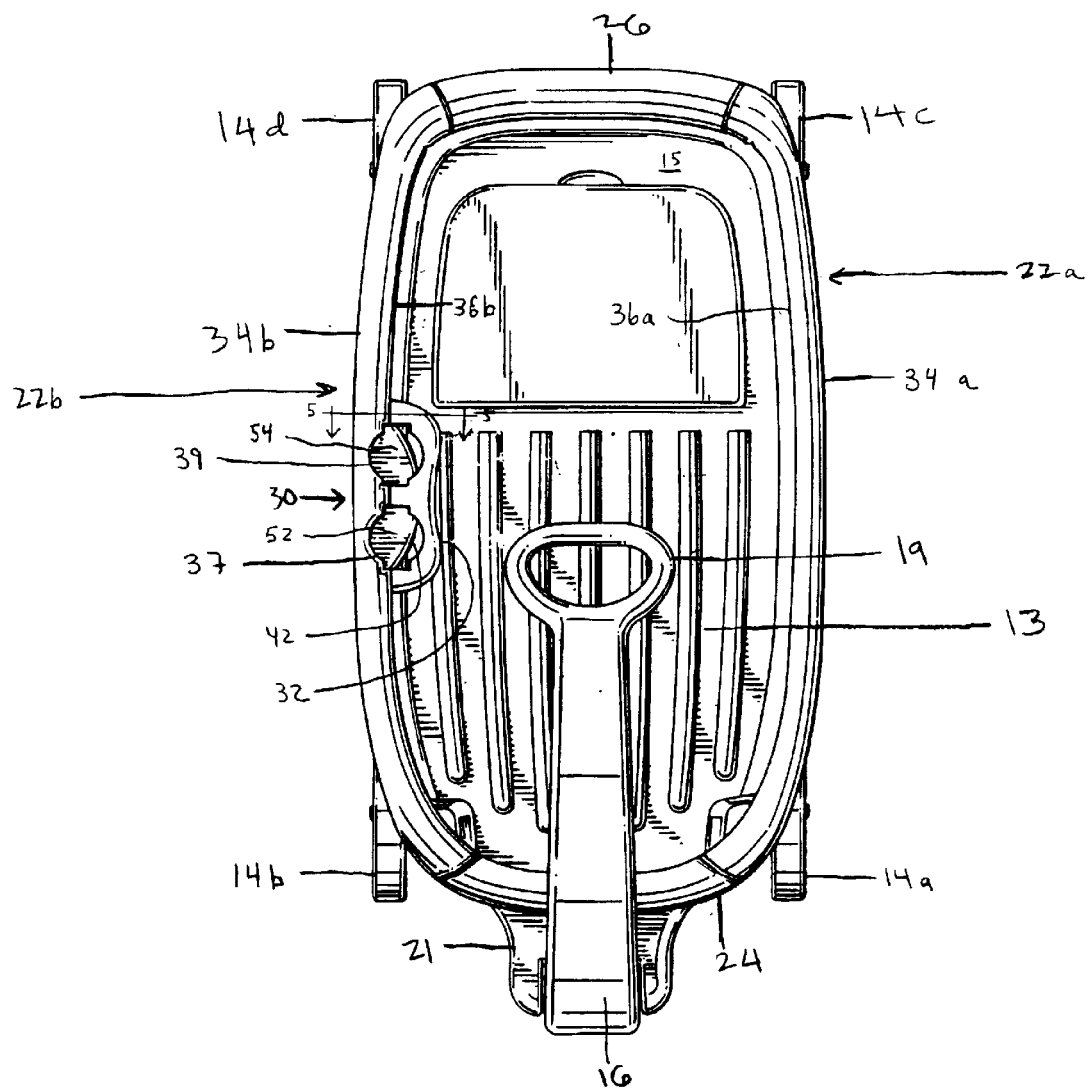
FIG. 2 is a top plan view of the wagon of FIG. 1.

A wagon featuring a cup holder constructed in accordance with the present invention is indicated in general at 1 in FIG. 1 and FIG. 2. The wagon includes a wagon body 15 that defines the bottom of a passenger compartment or cargo area 13, a pair of front wheels 14a and 14b (FIG. 2), a pair of rear wheels 14c and 14d (FIG. 2) and a pulling and steering handle 16 upon which a looped gripping portion 19 is positioned. The rear wheels of the wagon are preferably mounted to the wagon body by a metal axle. The front wheels of the wagon are mounted upon a bolster 21, also preferably by a metal axle. The bolster is pivotally connected to the bottom of the body 15. The handle 16 is pivotally connected to the bolster 21 through use of a hinge pin 18. As an alternative to the bolster 21, the front wheels may be mounted to the wagon body by casters and the handle 16 pivotally connected to the wagon body.

The wagon also features left and right side walls, indicated in general at 22a and 22b, respectively, a front wall 24 and a rear wall 26, all removably mounted to the wagon body 15 (see tab 25 in FIG. 5 which engages a slot formed in the wagon body). The wagon body, removable walls, bolster and handle preferably are constructed of molded plastic for durability and light weight. The left and right side walls each include an outer panel 34a and 34b (FIG. 2) and an inner panel 36a (FIG. 2) and 36b, respectively.

The wagon also includes an embodiment of the cup holder of the present invention indicated in general at 30. While the invention is described below as a cup holder, it is to be understood that it may be employed as a holder of other types of objects including alternative types of beverage or food containers, tools, toys, etc. In addition, while the cup holder is illustrated as mounted on the inside panel 36b of the right side wall 22b of the wagon, it could alternatively be positioned on the inside panels of the left, front or rear walls. As will be described in greater detail below, the cup holder assembly 30 includes a generally E-shaped bracket 32 featuring openings 52 and 54. Preferably, the bracket 32 is also constructed of molded plastic.

The inner panel 36b of the right side wall has a pair of curved surfaces 37 and 39 molded therein that oppose the openings 52 and 54 of bracket 32. In addition, a curved ledge 42 is molded on the inner panel 36b beneath the bracket 32 and curved surfaces 37 and 39. The ledge 42 supports the bottoms of cups or other containers that are received within the openings 52 and 54 of the bracket 32.

Figure 3:
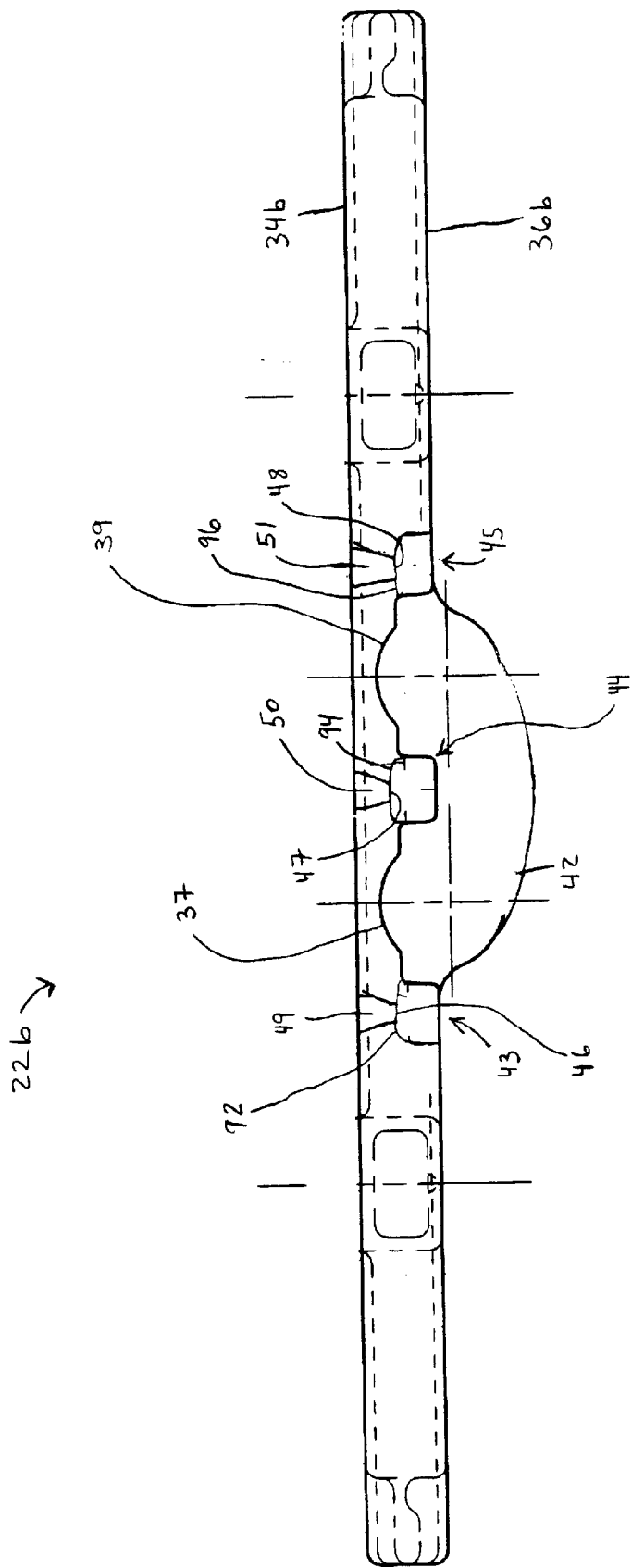
FIG. 3 is a sectional view of the right side wall and the cup holder of the wagon of FIG. 1, without the bracket, taken along line 3—3.

As illustrated in FIG. 3, in addition to curved ledge 42 and surfaces 37 and 39, the inner panel 36b of the right side wall 22b includes three cavities, indicated in general at 43, 44 and 45 respectively. Each cavity has a back wall 92, 94 and 96 with a bore formed therein, as illustrated at 46, 47 and 48 respectively. The three bores permit the three cavities to communicate with corresponding wells 49, 50 and 51 formed into the outer panel 34b of the right side wall 22b. As illustrated in FIGS. 3 and 5, each well preferably features the shape of a truncated cone. As will be described below, the cavities, bores and wells permit the cup holder bracket (32 in FIGS. 1 and 2) to be secured to the side wall 22b.

Figure 4:
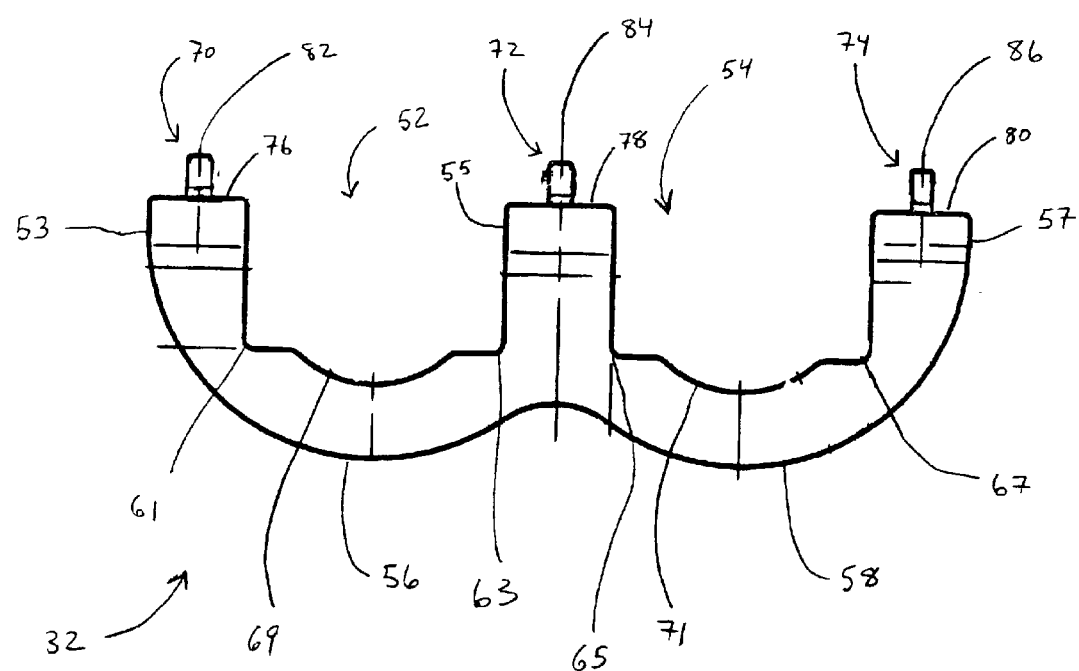
FIG. 4 is a top plan view of the bracket of the cup holder of FIGS. 1 and 2.

The E-shaped bracket of the cup holder 30 of FIGS. 1 and 2 is indicated in general at 32 in FIG. 4. The bracket 32 is constructed from three legs 53, 55 and 57 that are connected to, or integrally formed with, two outer sections 56 and 58. The three legs and two outer sections define two openings, indicated in general at 52 and 54, and provide the bracket 32 with an overall E-shaped appearance. The bracket 32 can be expanded to accommodate additional containers by adding additional legs and outer sections or made smaller by reducing the number of outer sections and legs so that a U-shaped bracket, for example, is formed. Pins, indicated in general at 70, 72 and 74 are formed on the flat end surfaces 76, 78 and 80 of legs 53, 55 and 57, respectively. The pins include enlarged head portions 82, 84 and 86.

While outer sections 56 and 58 of bracket 32 are shown as curved, this need not be the case. For example, the sections could be straight or a variety of other shapes. In addition, as illustrated in FIG. 4, the two openings 52 and 54 may include both corners 61, 63, 65 and 67, so that juice boxes and the like may be received by the cup holder, and arcuate walls 69 and 71, so that cylindrical beverage containers, such as cans and/or cups, may also be received by the cup holder.

As illustrated in FIG. 5, the middle leg 55 of the bracket, indicated in general at 32, engages the middle cavity 44 of the inner panel 36b of the wagon right side wall, indicated in general at 22b. More specifically, the bracket 32 is pressed towards wall 22b until the flat end surface 78 of the middle leg 55 abuts the back wall 94 of cavity 44. In doing so, the enlarged head portion 84 of the pin 72 (FIG. 4) is forced through the bore 47 and into well 50. As may be observed from FIG. 5, head portion 84 features somewhat of a triangular shape so that a base portion thereof is sized larger than the diameter of the bore 47, illustrated at 102 in FIG. 5. As a result, the leg 55 of bracket 32 may not be withdrawn from the cavity 44. The remaining legs of the bracket 32, that is, 53 and 57 in FIG. 4, are secured within the remaining cavities of the right side wall 22b, that is, 43 and 45 in FIG. 3, in a similar fashion, that is, by positioning the head portions 82 and 86 of the pins 70 and 74 of FIG. 4 through the bores 46 and 48 and into the wells 49 and 51 of FIG. 3. As a result, the bracket 32 is secured to the right side wall 22b of the wagon as illustrated in FIGS. 1 and 2.

In addition, the pin head portion 84 and the flat end surface 78 of the middle leg 55 cooperate to secure the portions of inner panel 36b and outer panel 34b that form the cavities and wells, respectively, together. This increases the rigidity of the side wall 22b in the vicinity of the bracket 32.

Because the enlarged head portions of the pins of bracket 32 remain recessed within wells of outer panel 34b, as illustrated with pin head portion 84 and well 50 in FIG. 5, a sticker 104, or some other covering, may be placed over the wells to hide the pin heads and provide outer panel 34b with a smooth appearance.

While the preferred embodiments of the invention have been shown and described, it will be apparent to those skilled in the art that changes and modifications may be made therein without departing from the spirit of the invention, the scope of which is defined by the appended claims.

What is claimed is:

1. A device for holding objects on a wagon comprising:

a) a wall having a first panel and a second panel, said second panel having a well formed therein and said first and second panels having a bore formed there through and in communication with the well;

b) a bracket having a pin positioned thereon;

c) said bracket positioned adjacent to the first panel of the wall with said pin passing through the bore and positioned within the well of the second panel so as to secure said bracket to the wall; and d) said first panel including a cavity formed therein, said cavity communicating with the well formed in the second panel through the bore and wherein said bracket includes an end engaging the cavity.

2. The device of claim 1 wherein the cavity has a back wall and the bracket end has a flat end surface and wherein the flat end surface of the bracket abuts the back wall of the cavity when the bracket end engages the cavity.

3. The device of claim 1 wherein the pin of the bracket has an enlarged head portion and the enlarged head portion is positioned within the well.

4. The device of claim 1 wherein the first and second panels are constructed of plastic.

5. The device of claim 1 wherein the first panel has a curved surface formed therein, said curve surface facing the bracket.

6. The device of claim 4 wherein the bracket is constructed from plastic.

7. A wagon having a device for holding objects comprising:
a) a body;
b) a pair of front wheels, a pair of rear wheels and a handle attached to said body;
c) side, front and rear walls positioned on said body so that a cargo area is defined;
d) one of said walls including an first panel and a second panel, said second panel having a well formed therein and a bore formed through the first and second panels and in communication with the well;
e) a bracket having a pin positioned thereon;
f) said bracket positioned adjacent said first panel of the wall with said pin passing through said bore and positioned within the well of the second panel so as to secure said bracket to the wall; and
g) said first panel including a cavity formed therein, said cavity communicating with said well through the bore and wherein said bracket includes an end with said end engaging said cavity.

8. The wagon of claim 7 wherein the cavity has a back wall and the bracket end has a flat end surface and wherein the flat end surface of said bracket abuts the back wall of said cavity when the bracket end engages said cavity.

9. The wagon of claim 7 wherein the pin of the bracket has an enlarged head portion and the enlarged head portion is positioned within the well.

10. The wagon of claim 7 wherein the first and second panels and the bracket are constructed of plastic.

11. A device for holding objects on a wagon comprising:
a) a wall having a first panel and a second panel, said second panel having a well formed therein and said first and second panels having a bore formed there through and in communication with the well;
b) a bracket having a pin positioned thereon;
c) said bracket positioned adjacent to the first panel of the wall with said pin passing through the bore and positioned within the well of the second panel so as to secure said bracket to the wall; and
d) said bracket including a leg and an outer section, said outer section connected to said leg so that an opening adapted to receive the objects is defined.

12. A device for holding objects on a wagon comprising:
a) a wall having a first panel and a second panel, said second panel having a well formed therein and said first and second panels having a bore formed there through and in communication with the well;
b) a bracket having a pin positioned thereon;
c) said bracket positioned adjacent to the first panel of the wall with said pin passing through the bore and positioned within the well of the second panel so as to secure said bracket to the wall; and
d) said first panel having a ledge positioned thereon, said ledge positioned beneath said bracket.

13. A device for holding objects on a wagon comprising:
a) a wall having a first panel and a second panel, said second panel having a well formed therein and said first and second panels having a bore formed there through and in communication with the well;
b) a bracket having a pin positioned thereon;
c) said bracket positioned adjacent to the first panel of the wall with said pin passing through the bore and positioned within the well of the second panel so as to secure said bracket to the wall; and
d) a covering placed on the second panel so as to cover the well.

14. A wagon having a device for holding objects comprising:
a) a body;
b) a pair of front wheels, a pair of rear wheels and a handle attached to said body;
c) side, front and rear walls positioned on said body so that a cargo area is defined;
d) one of said walls including an first panel and a second panel, said second panel having a well formed therein and a bore formed through the first and second panels and in communication with the well;
e) a bracket having a pin positioned thereon;
f) said bracket positioned adjacent said first panel of the wall with said pin passing through said bore and positioned within the well of the second panel so as to secure said bracket to the wall; and
g) said bracket including a leg and an outer section, said outer section connected to said leg so that an opening adapted to receive the objects is defined.

15. A wagon having a device for holding objects comprising:
a) a body;
b) a pair of front wheels, a pair of rear wheels and a handle attached to said body;
c) side, front and rear walls positioned on said body so that a cargo area is defined;
d) one of said walls including a first panel and a second panel, where the first panel is an inner panel and the second panel is an outer panel, said second panel having a well formed therein and a bore formed through the first and second panels and in communication with the well;
e) a bracket having a pin positioned thereon;
f) said bracket positioned adjacent said first panel of the wall with said pin passing through said bore and positioned within the well of the second panel so as to secure said bracket to the wall; and
g) said inner panel having a curved surface formed therein, said curve surface facing the bracket.

16. The wagon of claim 15 wherein a covering is placed on the outer panel so as to cover the well.

17. A wagon having a device for holding objects comprising:
a) a body;
b) a pair of front wheels, a pair of rear wheels and a handle attached to said body;
c) side, front and rear walls positioned on said body so that a cargo area is defined;
d) one of said walls including a first panel and a second panel, where the first panel is an inner panel and the second panel is an outer panel, said second panel having a well formed therein and a bore formed through the first and second panels and in communication with the well;
e) a bracket having a pin positioned thereon;
f) said bracket positioned adjacent said first panel of the wall with said pin passing through said bore and positioned within the well of the second panel so as to secure said bracket to the wall; and
g) said inner panel having a ledge positioned thereon, said ledge positioned beneath said bracket.

* * * * *